Jan. 1, 1963    J. B. JONES ET AL    3,071,216
SANDWICH CONSTRUCTION INCORPORATING DISCRETE METAL CORE
ELEMENTS AND METHOD OF FABRICATION THEREOF
Filed Dec. 29, 1958    2 Sheets-Sheet 1
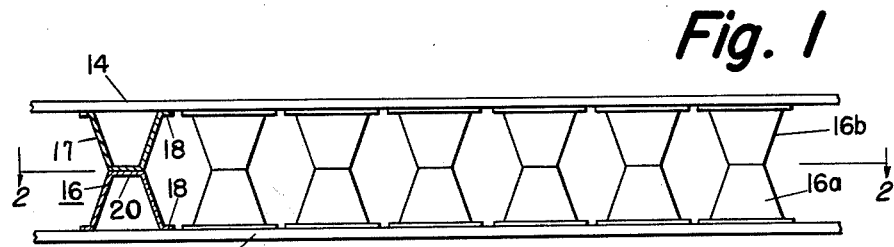
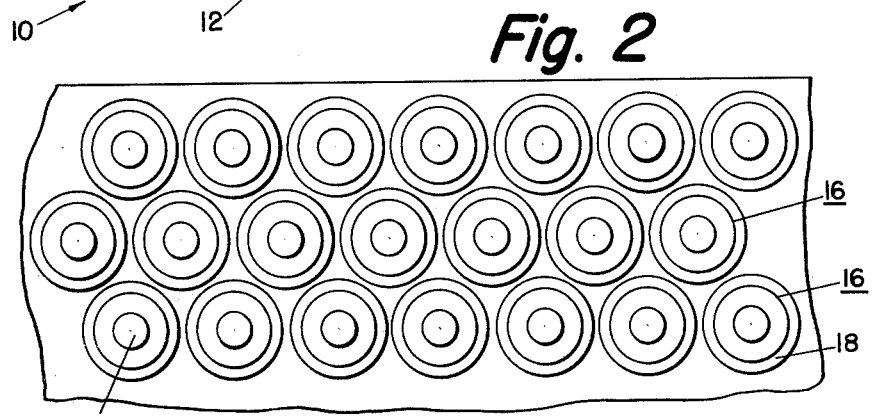
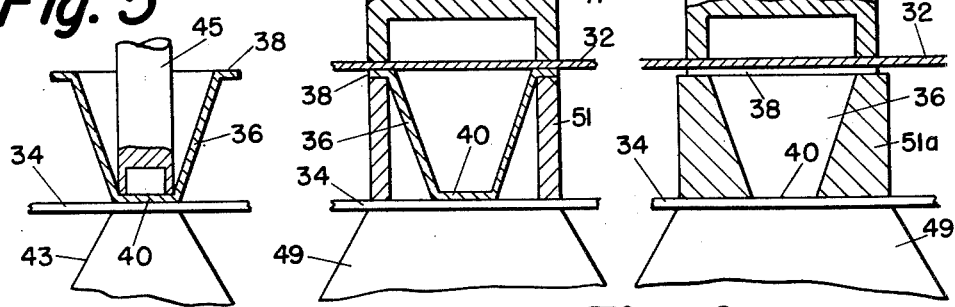
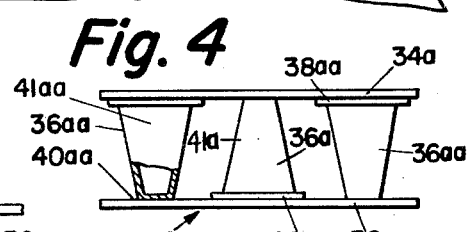
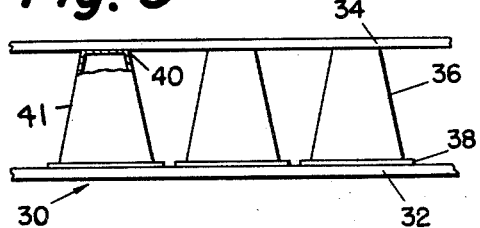
INVENTORS
JAMES BYRON JONES
WILLIAM C. POTTHOFF
BY
Arthur H. Seidel
ATTORNEY

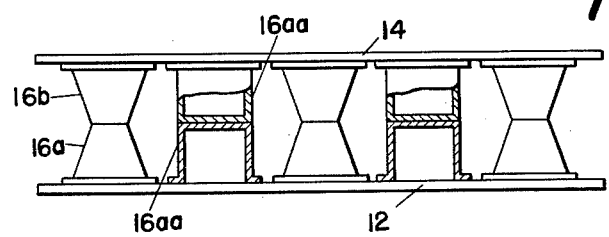
Fig. 6
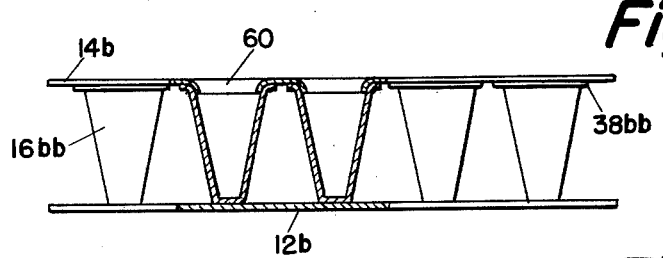
Fig. 7
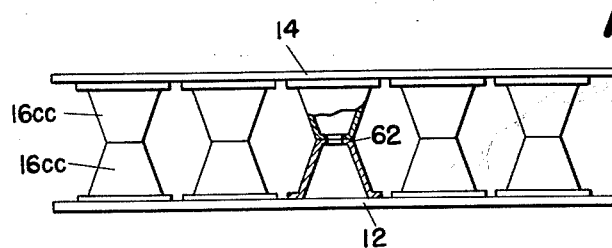
Fig. 8
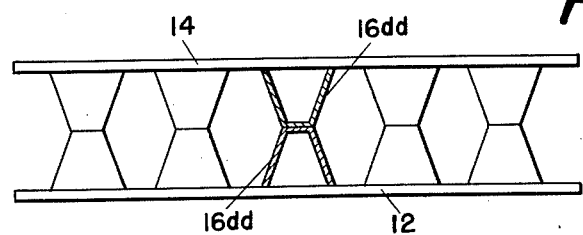
Fig. 9
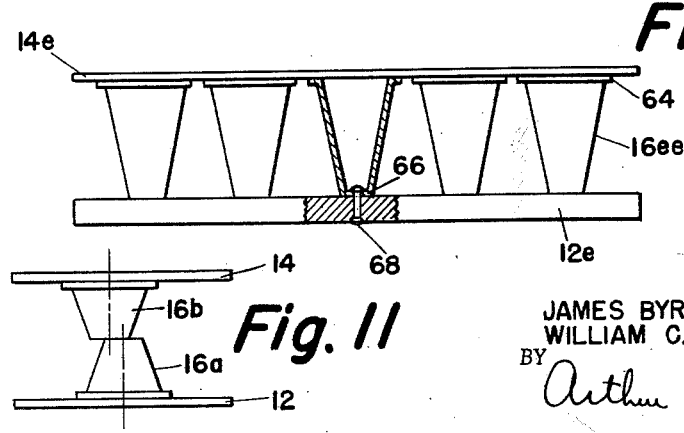
Fig. 10
Fig. 11
INVENTORS
JAMES BYRON JONES
WILLIAM C. POTTHOFF
BY Arthur H. Seidel
ATTORNEY 3,071,216
SANDWICH CONSTRUCTION INCORPORATING DISCRETE METAL CORE ELEMENTS AND METHOD OF FABRICATION THEREOF
James Byron Jones and William C. Potthoff, West Chester, Pa., assignors, by mesne assignments, to Sonobond Corporation, West Chester, Pa., a corporation of Pennsylvania
Filed Dec. 29, 1958, Ser. No. 783,424
4 Claims. (Cl. 189—34)

The present invention is directed to a sandwich construction incorporating discrete metal core elements and to a method of fabrication thereof, so as to permit greater adaptability as to size, gage, compound curvature, thermal application, etc., and to lessen construction difficulties in the fabrication of sandwich or stand-off panels.

The use of sandwich-type constructions for high strength, low weight, and special thermal shields is well known, such sandwiches usually being of the three-ply type and being fabricated by attaching a layer of a light-weight core material between two relatively thin outer skins or sheets, with the core and skins being made of the same material or of dissimilar materials according to specific environment, loading, and cost conditions, and with the core usually having other than sheet-like shape.

In some instances, when it is desired for thermal shielding, a single panel of heat-resistant material may be stood off from its basic support, in which case the construction is not necessarily a true sandwich.

Best known of the various types of core elements is probably the honeycomb, in itself a generally flexible and fragile construction, made of such materials as paper, impregnated fabric, reinforced plastic, or metal furnished to the user in either expanded or unexpanded form. In fabricating a honeycomb-sandwich structure, the connected walls of the individual honeycomb cells are placed in the manner of hollow columns holding the two facing skins apart and the facing sheets or skins are attached to the core so as to close off the holes in the honeycomb, thereby forming a rigid and dimensionally-stable panel with closed faces and a center having little weight in relation to its thickness (depending on material, wall gage, and cell size). In load-carrying applications, the facing or skin materials carry essentially all of the compressive, bending, or tension loads whereas the core carries the shear. Metal skins can be attached to metal honeycomb cores in a number of ways, depending on core and facing materials and the strength and other environmental requirements of a particular application. Adhesive-resin bonding, either with or without the addition of a piece of impregnated cloth between core and skin is a common means of attachment; however, brazing and spotwelding may be used to provide high-strength durable bonds in metallurgical materials although these are often expensive and difficult to make.

Metal honeycomb involves formation of extremely thin cell walls on the order of 0.001 inch to 0.005 inch thick. Furthermore, the honeycomb in some cases must be machined to precise honeycomb cell height, often to a tolerance of ±0.001 inch for reasons of better joining. The achievement of abutment junctions between essentially all of the ends of the honeycomb cell walls and the overlaying skins is extremely difficult, to the point that usually high rejection rates are common. Abutment bonding over the entire area must be virtually complete or the skins of the sandwich material are incompletely stabilized and will buckle under compression and certain bending loads. Large expenditures have been made in recent years in efforts to improve the bond quality between the honeycomb cell wall ends and the overlaying skins. When it is considered that the honeycomb cells often have dimensions across the points of between ⅛-inch and ½-inch, and that honeycomb core panels come in dimensions of one or more feet in width and several feet in length, it may be seen that junctions between the honeycomb cell wall ends and the overlaying skins are very difficult to achieve when virtually perfect bonding of such large areas is necessary. Moreover, since this bonding is usually a brazing operation at temperatures in excess of 875° C., the tooling necessary to accomplish flat or curved structures is exceedingly expensive and subject to problems resulting from temperature exposure. Furthermore, the brazing metal must be used in modest excess to minimize the probability of unbonded areas, and this excessive brazing metal adds ineffective weight to the sandwich structure.

Recently, it has become necessary to fabricate lightweight structures of high-temperature materials, such as 300-series stainless steels, certain exotic metals such as molybdenum, titanium, etc., and alloys of these metals. Honeycomb core made of these materials is costly, both because of the relative rarity of these metals and alloys and because of the difficulties involved in furnishing them in the desired dimensions. Furthermore, for high-temperature use, it is desired to take full advantage of the properties of the materials and use of braze metal in connection therewith (because of the comparatively low melting point of the braze metal) is therefore undesirable.

Thus the problem involves either welding or mechanical fasteners and the latter are unsatisfactory for reasons of weight.

Resistance welding of honeycomb-type configurations is not altogether satisfactory. The thin-walled metal honeycomb materials are not well adapted to the requirement of highly localized static forces associated with resistance spotwelding. Moreover, the weld nuggets produced by such welding together of thin metals are usually of small area—sometimes point-like—and have a cast metallurgical structure whose reliability often leaves something to be desired.

Another well known type of core element is the integrated core, such as (1) the continuous-sheet corrugated saw-tooth or sine-wave shape having straight, parallel, and regular ridges and hollows, or (2) the waffle-grid type consisting of cylinders, cones, or other types of individual projections joined at their bases by means of the sheet material from which the projections are formed, or (3) the separate tube, hat, or other tunnel construction with each tunnel extending the length or width of the sheet and parallel to other individual tunnels which may or may not be joined to each other at their bases in making a complete core. Directional characteristics of these integral cores present advantages in a number of structures because the core may be a uniaxial load-carrying member in addition to its contribution to the rigidity of the panel.

Joining of integrated cores to overlaying skins provides a somewhat greater amount of edge margin than do honeycomb cell walls, but the joining problems are somewhat similar to those outlined above. Furthermore, the load carried by "tunneled" cores is essentially limited by the unidirectional construction, and the "waffle" and "tunnel" types provide excess weight in the form of the sheet metal which joins them to one another at their bases. In connection with resistance welding both these and the honeycomb constructions, not only tiny welds but also electrical shunting effects are commonly encountered.

In addition to structural sandwich material, there also exists a need for thermal sandwich material to reduce heat transfer by conduction from one side of a surface to the opposite side of a surface. For example, in aircraft the fire-wall separating the pilot from the engine compartment may be exposed to exceedingly high temperatures on the engine side yet the pilot must be protected. It is apparent that if, instead of having a solid fire-wall, the cross-section of material could be reduced to a small fraction, the quantity of heat that could be conducted from the engine side to the interior would be small in proportion. Hence, one solution for protecting the inner surface or interior involves the use of sandwich material for such thermal applications, structural strength being of secondary importance. The use of a filler or core material to space and insulate the outer skin from the inner skin provides a greatly reduced cross-section through which the heat can be carried from the outer skin to the interior skin. If the core material can be provided in a form which is both smaller in cross-section and lighter in weight than most conventional core materials, and if this core material can be joined to the inner and outer skins by means of a new process offering advantages over other process, a better sandwich material will have been made available.

This invention has as an object the provision of a novel sandwich and stand-off skin arrangement.

This invention has as another object the provision of a lightweight sandwich arrangement having high structural integrity.

This invention has as a further object the provision of an arrangement which is cheaper to produce, especially in limited production, than many types of conventional honeycomb constructions and yet possesses the structural desiderata of honeycomb structures.

This invention has as yet another object the provision of a sandwich arrangement which can be readily adapted to the formation of single or compound curve structures.

This invention has as yet another object the provision of a novel method for forming sandwich arrangements.

This invention has as a still further object the provision of a relatively simple method for forming sandwich arrangements in which close fabrication tolerances are greatly alleviated.

This invention has as an additional object the provision of a thermal sandwich arrangement.

This invention has as a yet additional object the provision of a sandwich arrangement that is relatively easy to fabricate, particularly in the form of compound curves.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is an elevational view, partly in section, of a preferred embodiment of the present invention.

FIGURE 2 is a plan view, viewed from above, taken on line 2—2 of FIGURE 1.

FIGURE 3 is a fragmentary elevational view, partly in section, revealing another embodiment of the sandwich arrangement of the present invention.

FIGURE 4 is a fragmentary elevational view, partly in section, revealing another embodiment of the sandwich arrangement of the present invention.

FIGURE 5 is a fragmentary view revealing an early stage in the process of the present invention.

FIGURE 5A is a fragmentary view revealing a later stage in the process of the present invention.

FIGURE 5B is an alternative embodiment of the later stage in the process of the present invention shown in FIGURE 5A.

FIGURE 6 is a fragmentary elevational view, partly in section, of another embodiment of the sandwich arrangement of the present invention.

FIGURE 7 is a fragmentary elevational view partly in section of another embodiment of the sandwich arrangement of the present invention.

FIGURE 8 is a fragmentary elevational view partly in section of another embodiment of the sandwich arrangement of the present invention.

FIGURE 9 is a fragmentary elevational view, partly in section, of another embodiment of the sandwish arrangement of the present invention.

FIGURE 10 is a fragmentary elevational view, partly in section, of another embodiment for assembling the sandwich arrangement of the present invention.

FIGURE 11 is a fragmentary elevational view revealing diagrammatically the non-essentiality of precise alignment for the spacer elements in a preferred embodiment of the sandwich arrangement of the present invention.

Referring to the drawings, and initially to FIGURES 1 and 2, the sandwich arrangement of the present invention shown therein is designated generally as 10. Such sandwich arrangement 10 comprises a pair of juxtaposed parallel skins 12 and 14 formed of thin metal, such as aluminum alloy, stainless steel, molybdenum, molybdenum-titanium alloy, or other exotic metal having for example a thickness of the order of 0.005 inch to 0.25 inch. In most conventional sandwich arrangements, the skins 12 and 14 will be spaced from each other by a distance of between about one-eighth inch to several inches.

The skins 12 and 14 are maintained spaced from each other by numerous discrete abutting frustoconical spacer elements 16.

While a presently preferred embodiment of a spacer element is a frustoconical spacer element, the present invention comprehends the use of other individual abutting hollow geometrical shapes for spacer elements, as more fully set forth below and in FIGURE 6. The frustoconical spacer element construction shown in FIGURES 1 and 2 provides a truss-type arrangement between the skins which supplies shear stiffness necessary to give bending strength and skin stabilization to the sandwich construction.

As shown in FIGURE 2, the spacer elements 16 may be arranged in parallel lines running crosswise, with the spacer elements 16 in each adjacent parallel line of spacer elements being offset.

However, while the staggered arrangement of spacer elements 16 shown in FIGURE 2 may be preferred for certain types of applications, other arrangements of the spacer elements 16 in patterns differing from that of FIGURE 2 may be utilized, and it is to be understood that such other arrangements are contemplated within the present invention, it being understood that the specific arrangement may go far toward optimizing the use of this material for certain types of end item use.

Each of the frustoconical spacer elements 16 comprises a single riser portion 16 consisting of a hollow frustum of a cone. The base of each spacer element 16 is provided with an annular integral flange 18.

The uppermost surface 20 of each spacer element 16 is formed as an approximately flat surface or it may have modified contours.

In FIGURE 1 the frustoconical spacer elements secured to skin 12 are designated 16a, and the frustoconical spacer elements secured to skin 14 are designated 16b. It will be seen that the uppermost surfaces of spacer elements 16a and 16b are secured together, with the annular flanges 18 of respective spacer elements 16a and 16b being secured respectively to the skins 12 and 14. The securement between the uppermost surfaces of the spacer elements 16a and 16b, and between the annular flange 18 of each of the spacer elements 16a and skin 12 and the annular flange 18 of each of the spacer elements 16b and skin 14 should be a metallurgical bond, and in the preferred embodiments of our invention should be an ultrasonically welded joint.

It is to be noted that the precision required for successful fabrication of the double-skinned sandwich structure is far less critical with the present invention than with the presently most used honeycomb methods, e.g., with the presently most used honeycomb construction, the uniformity of metallurgical bond over the surface depends upon precise abutment contact between the cell walls and the facing skins, which if not achieved, results in excess braze metal, unbonded areas, etc.

As shown in FIGURE 11, the precise alignment of the abutting surfaces of the spacer elements 16a and 16b is not essential and misalignment of such spacer elements 16a and 16b will not destroy the utility of the resulting sandwich structure.

There is little or no difficulty in making spacer elements of the present invention having a height that is accurate and precise to a fraction of 0.001 inch; thus, the total thickness of the sandwich structure material is conveniently held to narrow limits, while, at the same time joining precision is less critical.

Each of the spacer elements 36 of the embodiment of FIGURE 3 resembles each of the spacer elements 16 of the embodiment of FIGURE 1. Thus, each spacer element 36 includes an annular flange 38 which is metallurgically joined to skin 32, and an uppermost surface 40 of the riser portion 41 which is metallurgically joined to skin 34.

The sandwich arrangement 30 possesses the advantage over the sandwich construction of FIGURE 1 of not requiring any alignment whatsoever between surfaces of relatively small area, namely the uppermost surfaces 20 of the spacer elements 16a and 16b.

As with the sandwich arrangement of FIGURE 1, a variety of discrete hollow spacer element shapes may be used to replace the frustoconical spacer elements 36.

In the embodiment shown in FIGURE 4, the sandwich arrangement 30a generally resembles that of FIGURE 3 except that some of the spacer elements 36a are individually joined by their flanges 38a to skin 32a and by their uppermost surfaces 40a of their riser portions 41a to skin 34a, while the remaining spacer elements 36aa are individually joined by their flanges 38aa to skin 34a and by their uppermost surfaces 40aa of their riser portions 41aa to skin 32a, thus permitting an altered degree of skin stabilization by means of the thus more closely spaced connecting elements. The spacer elements 36a and 36aa of sandwich arrangement 30a are formed like the spacer elements 36 of sandwich arrangement 30 of FIGURE 3.

The method for preparing a sandwich arrangement of the present invention will be illustrated in reference to the sandwich arrangement 30 of FIGURE 3.

Referring to FIGURES 5, 5A, and 5B, the spacer elements 36 are first metallurgically joined to the skin 34. This is accomplished by ultrasonically ring welding the uppermost surface 40 of each spacer element 36 to the skin 32. While ultrasonic ring welding is to be preferred, other ultrasonic or vibratory welding methods may be used. A preferred method for effecting vibratory ring welding is that described in copending patent application Serial No. 739,555 filed on June 3, 1958, in the name of James Byron Jones and Carmine F. De Prisco, the disclosure of which is incorporated herein and made a part hereof. Other vibratory welding methods are disclosed in the patent applications referred to in Serial No. 739,555, any one of which may be used to effect the aforesaid metallurgical joints. Such vibratory weldments are characterized by a deformation below that necessary to effect pressure welding, and which need not be more than ten percent, and such weldments exhibit no cast structure which is visible on any ordinary microscopic scale. The skin 34 may be supported on a torsionally rigid anvil diagrammatically indicated as 43 in FIGURE 5, and the sonotrode 45 inserted within the spacer element 36, with the uppermost surface 40 of the spacer element 36 and the skin 34 being intermediate the tip of the sonotrode 45 and the torsionally rigid anvil 43. The tip of sonotrode 45 comprises an annular tip whose outside diameter is somewhat less than the juxtaposed circular surface of the underside of the uppermost surface 40 of the spacer element 36 with which the sonotrode 45 is engaged. Upon the torsional vibration of the tip of sonotrode 45, which may be accomplished by any of the means disclosed in Serial No. 739,555, the uppermost surface 40 of the spacer element 36 will be welded to the skin 34.

After one spacer element 36 is ring welded to the skin 34, the sonotrode 45 is withdrawn, and then another spacer element 36 is similarly ring welded to the skin 32. Of course, a plurality of spacer elements may be simultaneously welded to the skin 32 by the use of a plurality of sonotrodes.

The use of the ring welding method of aforementioned patent application Serial No. 739,555 produces a sandwich construction superior to that which could be accomplished either by brazing or by fusion welding techniques, such as resistance welding. Thus, there is no contamination in the metallurgical bond due to the braze metal, nor is there an excess of braze metal. Furthermore, there are no brittle cast structures evident on the ordinary microscopic scale in the metallurgical joint resulting from the ultrasonic ring weld accomplished as aforesaid.

As illustrative of an example of the ring weld in the present invention, a welder of the general type shown in FIGURES 1 and 2 of aforesaid patent application Serial No. 739,555 but operating at a normal frequency of 20,000 cycles per second and having three transducer couplers attached to the sonotrode was used to form ring welds in spacer elements of the type shown in FIGURE 3. Using approximately 800 total watts of power input to the transducers at a clamping force of 300 pounds and a weld time of 0.15 second for each ring weld, weldments were formed between spacer elements made of 1100–H14 aluminum having a thickness of 0.010 inch and a skin of 0.015 inch thick 1100–H14 aluminum.

Where the thermal and strength characteristics of but one of the skins is critical, it is possible in accordance with the method of the present invention to ultrasonically ring weld the spacer elements to one of the skins and to use other joining methods to join the spacer elements to the other of the skins, as for example to use brazing techniques to join the flanges 38 of the spacer elements 36 to the skin 32. Alternatively, other means may be used to join the flanges 38 to the skin 32.

The present invention also comprehends ring welding the flanges 38 of the spacer elements 36 to the skin 32, as by the use of the ring welding apparatus disclosed in FIGURE 13 of aforementioned patent application Serial No. 739,555, and joining the uppermost surface 40 to the skin 34 by other means, as by brazing techniques, or by blind rivets, etc.

In order to form the sandwich constructions of the present invention in which the spacer elements are metallurgically joined to both of the skins by ultrasonic welding techniques, and hence are free from braze metal contamination and adverse thermal effects, the procedure shown in FIGURE 5A may be followed. In this method, the uppermost surface 40 of each of the spacer elements 36 is ring welded to the skin 34 as has heretofore been explained in connection with FIGURE 5. The skin 32 is then ring welded to the flange 38 of the spacer element 36 using the sonotrode 47. The sonotrode 47 may be of the type shown in the embodiment of FIGURES 1 and 2 of aforesaid patent application Serial No. 739,555, and the welder of such embodiment may be used herein.

In the method of FIGURE 5A the sandwich construction is supported on the anvil 49 and the spacer 51 is disposed intermediate the inner surface of the flange 38 and the skin 34 to which the uppermost surface 40 of the spacer element 36 is metallurgically joined by a ring weldment. The spacer 51 may be a tubular metal element which has been split lengthwise and fastened back together with a soluble resin or with a low-temperature solder alloy. The spacer 51 withstands the compression load resulting from the clamping force exerted by the sonotrode 47 when the sandwich construction is supported on the anvil 49.

After the ring weld between the skin 32 and the flange 38 of spacer element 36 has been effected, the spacer 51 may be withdrawn. This is readily accomplished, in the case of a multisplit spacer whose joints comprise a soluble resin or a low temperature solder which can easily be removed. Alternatively, it is possible to melt out or dissolve out the entire spacer 51.

In the embodiment shown in FIGURE 5B, the identical procedure heretofore explained in connection with FIGURE 5A is used except that the spacer 51a comprises a support which embraces the spacer elements 36 and gives maximum support therefor. In the embodiment of FIGURE 5B, the spacer 51a may be removed by dissolving or by melting. Thus, for example, where the skins and spacer elements are formed of metals such as molybdenum, if copper or mild steel spacers are used, the same may be readily dissolved away by acids without injury to the skins or spacing elements.

A wide variety of types of spacer elements may be used in a single sandwich arrangement, with the particular shape of spacer element being varied for optimum accommodation to the structural or other problems, and to the shape requirements of its particular portion of the sandwich arrangement.

In the embodiment shown in FIGURE 6, cylindrical spacer elements 16aa may be used adjacent frustoconical spacer elements 16a and 16b intermediate the skins 12 and 14.

In the embodiment shown in FIGURE 7, the sandwich construction is of the open-faced type. Thus, the spacer elements 16bb are ring welded, as by the method of patent application Serial No. 739,555 to skin 12b which is an imperforate skin. The flanges 38bb of the spacer elements 16bb are ring welded to skin 14b. Skin 14b comprises a perforate skin having openings 60, which comprise preformed offset annuli, which are received within the spacer elements 16bb. The flanges 38bb are ring welded to skin 14b about the annuli formed at the openings 60 in skin 14b.

A wide variety of techniques may be used to form the sandwich construction shown in FIGURE 7. Thus, the flanges of the spacing elements 16bb may be first ring welded to perforate 14b and then their apexes joined to imperforate skin 12b as by ring welding, or by other means, such as by resistance welding, brazing, soldering, etc. Of course, in the preferred embodiment of the present invention in which both of the skins 12b and 14b are free from adverse cast structural effects, the spacing elements 16bb are ultrasonically welded to both the skins 12b and 14b.

In the embodiment of FIGURE 8, the sandwich construction resembles that of the embodiment of FIGURES 1 and 2 except that the spacing elements 16bb are provided with perforated uppermost surfaces 62.

While the provision of an annular flange at the base of each of the spacing elements is to be preferred, as this facilitates ring welding in accordance with the process of patent application Serial No. 739,555, the present invention includes sandwich constructions whose base does not include an offset flange, as for example the sandwich construction shown in FIGURE 9 in which the spacing elements 16dd are devoid of such flange.

In the sandwich construction of FIGURE 10, spacing elements 16ee, which generally resemble the spacing elements 36 of the embodiment of FIGURE 3 are used. However, while the flange 64 of such spacing elements is ring welded to the skin 14e in the embodiment of FIGURE 10, the uppermost surface 66 is mechanically secured to the skin 12e. This is done in the illustrated embodiment by the use of a rivet 68. This construction is of value where it is desirable that only the skin 14e be metallurgically joined to the spacing elements.

In any of the configurations illustrated in FIGURES 1 through 10, it is to be understood that it may be highly desirable and especially important to certain types of sandwiches that the discrete spacer elements, whether frustoconical or cylindrical, should be of a different metal or alloy than the skin material. For example, in the fire-wall application mentioned previously, it could be important that the skin be of a metal or alloy with extremely good heat-resistance properties (even though it may have relatively poor structural properties, e.g., it might be soft), and that the skin material be supported by a material such as molybdenum, for example, which has relatively good structural properties. Ultrasonic welding presents singular advantages in the welding of both refractory metals and dissimilar metal combinations.

The present invention may be embodied in other specific forms without departing from the spirit or essential attributes thereof and, accordingly, reference should be made to the appended claims, rather than to the foregoing specification as indicating the scope of the invention.

We claim:

1. The process for forming a structural sandwich element which comprises placing juxtaposed faces of a discrete hollow metal spacer element and a skin of a metal element in intimate contact at the intended weld zone, applying a force to the discrete hollow metal spacer element and the metal skin in a direction and of a magnitude to hold the contacting juxtaposed faces of the elements in intimate contact at the intended weld zone and to couple mechanically vibratory energy into said zone, introducing through a torsionally vibrating element contacting one of the to-be-welded metal elements adjacent the weld zone mechanical vibratory energy, whereby the peripheral portion of the torsionally vibrating element which engages the elements oscillates circumferentially, with the vibratory energy introduced to said juxtaposed elements from said torsionally vibrating element being at a sufficient energy level to weld said juxtaposed metal elements together, and then joining a portion of the hollow spacer element remote from said weld to another skin of a metal element.

2. A process in accordance with claim 1 in which the portion of the hollow spacer element remote remote from the weld is joined to another skin of a metal element by maintaining said portion and said other skin of a metal element in intimate contact, and forming a weld therebetween by a process similar to that utilized to form the aforesaid weld.

3. A structural sandwich arrangement comprising a pair of spaced metal skins, a plurality of hollow spacer elements comprising a flanged base and a top surface parallel to the underside of said flanged base, the underside of each flanged base of each spacer element being joined to one of the skins by a metallurgical joint comprising a ring-type weld which lacks a cast structure, and which has a highly disturbed interfacial region corresponding to the ring-type weld, and with the total thickness of the joined surfaces being deformed to an extent of less than ten percent.

4. A structural sandwich arrangement comprising a pair of spaced skins of metal, a plurality of hollow spacer elements disposed intermediate said spaced skins, each of said spacer elements comprising a base and a top surface parallel to the underside of the base, the underside of the base and the top surface parallel to the underside of the base of the spacer elements being joined to the skins of metal by a metallurgical joint, said metallurgical joint lacking a cast structure, being in the form of a ring, and having a highly disturbed interfacial region corresponding to the ring, with the total thickness of the joint being deformed to an extent of less than ten percent, whereby the spaced skins are fixedly retained opposite to each other with the spacer elements disposed therebetween.

References Cited in the file of this patent

UNITED STATES PATENTS

| | | |
|---|---|---|
| 1,042,885 | Budd et al. | Oct. 29, 1912 |
| 2,481,046 | Scurlock | Sept. 6, 1949 |
| 2,946,119 | Jones et al. | July 26, 1960 |

FOREIGN PATENTS

| | | |
|---|---|---|
| 150,122 | Australia | Feb. 18, 1953 |
| 769,663 | France | June 11, 1934 |
| 1,087,439 | France | Aug. 25, 1954 |